G. A. BRADY
Indicator.

No. 214,234. Patented April 15, 1879.

Attest:
Chas. H. Schoff
S. S. Schoff

INVENTOR:
Gilbert A Brady
By F. F. Warner, his
Attorney.

N. PETERS, PHOTO-LITHOGRAPHER, WASHINGTON, D. C.

200

UNITED STATES PATENT OFFICE.

GILBERT A. BRADY, OF CHICAGO, ILLINOIS, ASSIGNOR OF ONE-HALF HIS RIGHT TO CHARLES W. FERGUSON, OF JANESVILLE, WISCONSIN.

IMPROVEMENT IN INDICATORS.

Specification forming part of Letters Patent No. 214,234, dated April 15, 1879; application filed November 25, 1878.

*To all whom it may concern:*

Be it known that I, GILBERT A. BRADY, of Chicago, in the county of Cook and State of Illinois, have invented certain new and useful Improvements in Indicators or Tallies, of which the following, in connection with the accompanying drawings, is a specification.

Figure 1:
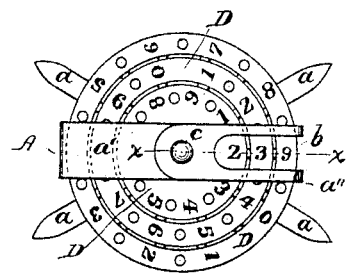
Figure 2:
Figure 3:
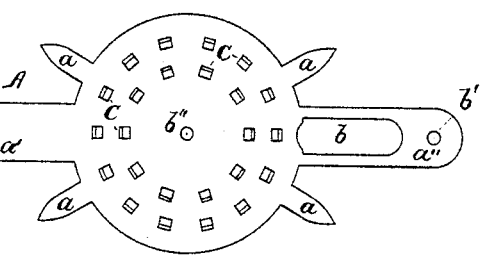
Figure 4:
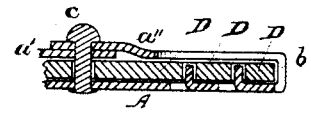

In the drawings, Figure 1 is a top or plan view of an indicator or tally embodying my invention; Fig. 2, a side or vertical elevation thereof; Fig. 3, a plan view of the blank of which the base and parts continuous therewith are made, and Fig. 4 a section.

Like letters of reference indicate like parts.

A represents the base piece or blank, the central part of which is disk-shaped, as shown. I make this part of flexible metal.

$a$ $a$ are radial prongs continuous with and extending from the edge of the disk A. $a'$ $a''$ are tongues, also continuous with and extending radially from the disk A. One of the tongues—$a''$, for example—is slotted, as shown at $b$, and in the ends of each are the holes $b'$ $b'$. The tongues $a'$ $a''$ are of such a length that when bent up and over the disk A at their junction therewith they will lap each other to such an extent at their ends that the holes $b'$ $b'$ will be directly over the center of the base, through the latter of which a hole, $b''$, is also made, so as to receive a pin or rivet, $c$, all of which is plainly shown in Fig. 4. The prongs $a$ $a$ are comparatively short, as represented.

It will be observed that the slot $b$ begins at or near the edge of the disk A.

C C are small projections struck up from the disk A, and arranged in circles concentric therewith. D D are flat metallic rings, graduated and numbered, as shown, and arranged concentric with the disk A. The rings D D are also punctured between the numerals thereon, as shown.

In order to arrange all these parts together to form a complete indicator or tally embodying my invention, I lay the rings D D upon the disk A in such a manner that the projections C C will stand up between them. I then turn the tongues $a'$ $a''$ up and over the rings D D, and pass the rivet $c$ through the holes made to receive it, and secure the said pin or rivet in its place in any suitable way. The projections C C serve as fixed washers, which separate the rings and prevent them from being moved by the friction of one against the other when one is moved, and the tongues $a'$ $a''$ hold the rings down in their places against the disk A. It is not essential, however, that this base or disk should be cut through in order to produce the projections C C, for very slight projections may be made without causing a rupture of the metal, and such projections will be sufficient ordinarily. Neither is it absolutely essential that holes should be made through the rings, as only slight depressions, or even small ribs, will answer the same purpose.

One tongue, extended entirely across the rings, may also be employed instead of two, as will hereinafter more fully appear.

In using this device as an indicator or tally—to serve to indicate, for example, the page at which I may have arrived in reading a book—I pass the prongs $a$ $a$ through the cover and clinch them, thus fastening the indicator to the book. If I stop reading at page 239, I place the point of a pencil or other suitable instrument in the holes next behind the corresponding numbers on the rings, and push each ring forward until the pencil strikes the tongue $a''$. By this means the proper figures are brought into view in the slot $b$, as shown in Fig. 1. The indicator, however, may be carried in the pocket and used for the purpose suggested, as well as for various other purposes.

I do not, therefore, here intend to restrict myself to the prongs $a$ $a$; neither do I here intend to be restricted to those features of construction which I have heretofore referred to as non-essential and as capable of modifications; but,

Having thus described my invention, what I claim as new, and desire to secure by Letters Patent, is—

1. The base or disk A, made of flexible material, and having thereon the projections C C, and one or more slotted tongues or clasps, $a''$, all made in one and the same piece, in combination with the index-rings D D, substantially as and for the purposes specified.

2. The index-rings D D, in combination with a base provided with the flexible prongs $a\ a$, substantially as specified.

3. The base or disk A, having thereon the projections C C, the prongs $a\ a$, and one or more slotted tongues or clasps, $a''$, all made in one piece of flexible metal, in combination with the index-rings D D, substantially as and for the purposes specified.

GILBERT A. BRADY.

In presence of—
 F. F. WARNER,
 JAMES H. COYNE.